United States Patent [19]

Averbuch

[11] Patent Number: 5,245,634
[45] Date of Patent: Sep. 14, 1993

[54] BASE-SITE SYNCHRONIZATION IN A COMMUNICATION SYSTEM

[75] Inventor: Nimrod Averbuch, Buffalo Grove, Ill.

[73] Assignee: Motorola, Inc., Schaumburg, Ill.

[21] Appl. No.: 856,426

[22] Filed: Mar. 23, 1992

[51] Int. Cl.[5] .......................... H04L 7/00; H04J 3/06
[52] U.S. Cl. .................... 375/108; 375/107; 370/104.1
[58] Field of Search ............ 370/104.1, 108, 103; 375/108, 107, 109, 115; 455/51.1, 51.2

[56] References Cited

U.S. PATENT DOCUMENTS

| | | | |
|---|---|---|---|
| 4,231,114 | 10/1980 | Dolikian | 455/51.1 |
| 4,696,052 | 9/1987 | Breeden | 455/51.2 |
| 4,800,560 | 1/1989 | Aoki et al. | 370/104.1 |
| 4,972,442 | 11/1990 | Steierman | 375/108 |

Primary Examiner—Curtis Kuntz
Assistant Examiner—Hai H. Phan
Attorney, Agent, or Firm—Raymond J. Warren; Richard A. Sonnentag

[57] ABSTRACT

A central-site (100) has located within it a synchronization system for purposes of backing-up a GPS external synchronization system. The central-site (100) is coupled to a plurality of base-sites (102, 103) which are required to be synchronized to one another. When the GPS signal is lost, the synchronization system within the central-site (100) allows the plurality of base-sites (102, 103) to maintain synchronization to one another. In this manner, the necessity for a synchronization system within each of the plurality of base-sites (102,103) is eliminated.

13 Claims, 3 Drawing Sheets

BASE-SITE SYNCHRONIZATION IN A COMMUNICATION SYSTEM

FIELD OF THE INVENTION

The invention relates generally to communication systems and more specifically to synchronization of base-sites in communications systems.

BACKGROUND OF THE INVENTION

In many communications systems, and more specifically, cellular radiotelephone systems, transmissions from a base-site to a mobile either has the capability to adjust transmission timing, or does not require any adjustment at all. However, in other cellular radiotelephone systems, specifically code-division multiple access (CDMA) cellular radiotelephone systems, absolute timing between the base-site and a subscriber unit is essential for effective operation of the system. The requirement for absolute synchronization is seen, not so much from a single base-site to subscriber unit perspective, but more from two or more base-sites to subscriber unit perspective. This is true since CDMA subscriber units are capable of diversity receiving transmissions from at least two base-sites, and making reception decisions upon either one, or both, of the transmissions as required. Clearly, to achieve this purpose, the two base-sites which perform the transmission of a signal must be synchronized absolutely in time so that the subscriber unit may receive both transmissions at the same time and perform reception as required.

One method of assuring synchronization between base-site in a CDMA cellular radiotelephone system is to use the global positioning system (GPS) which has been traditionally used for navigational purposes. GPS is a series of satellites synchronized in time and continuously transmitting, inter alia, time, date, and positioning information. By supplying GPS receivers at the base-sites, absolute synchronization of the communication system can be achieved. However, several inherent problems with GPS may occur. First, GPS may temporarily go out of service as the cesium or rubidium standards within the satellites require maintenance. Second, not every country in the world can receive a transmission from a GPS satellite.

To circumvent the inherent problems of GPS, co-located standards such as rubidium, cesium, or ovenized oscillators may be installed at the base-sites for backup purposes. However, as communication systems grow, the effect of having a GPS receiver and a standard for GPS backup in each base-site can become very expensive when analyzed on a per-channel basis for small and medium cell-sites. In fact, the standard and its related circuitry is one of the major costs for the base-site during both installation and maintenance of the system.

Thus, a need exists for a GPS backup configuration for use in a communication system that is centrally located so as to decrease the per channel cost of the standard while effectively maintaining absolute base-site synchronization in the communication system.

SUMMARY OF THE INVENTION

A communication system has a central-site coupled to a plurality of base-sites. The communication system has means, at the central-site, for providing a synchronization signal, and means, coupled to the means for providing, for synchronizing the plurality of base-sites to one another utilizing the synchronization signal.

DETAILED DESCRIPTION OF A PREFERRED EMBODIMENT

Figure 1:
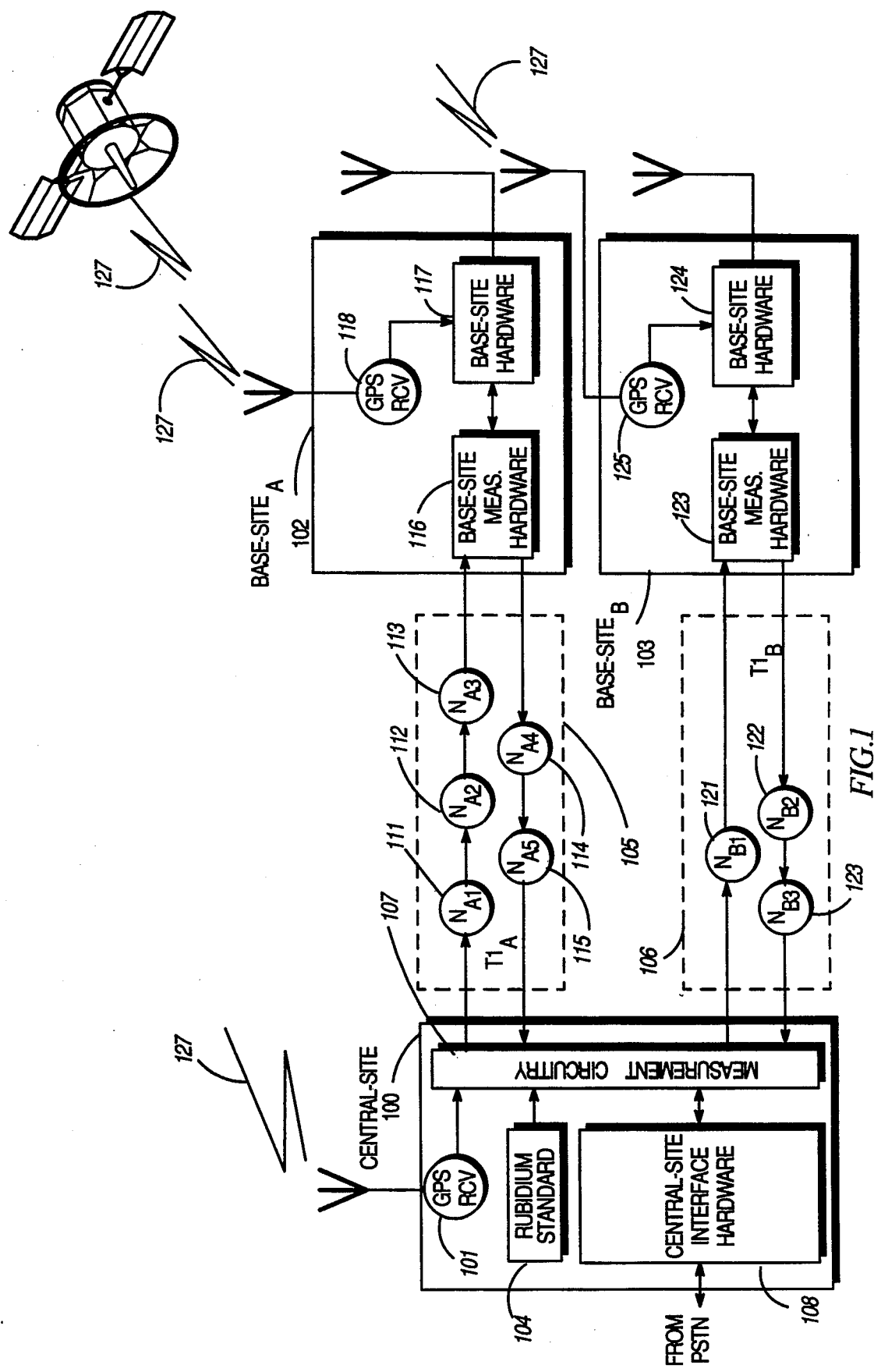
FIG. 1 generally depicts a communication system employing centralized standard backup in accordance with the invention.

FIG. 1 generally depicts a communication system employing centralized standard backup in accordance with the invention. In the preferred embodiment, the communication system is a CDMA cellular radiotelephone system. As depicted, a central-site 100 is coupled to at least two base-sites, base-site$_A$ 102 and base-site$_B$ 103. Base-site$_A$ 102 and base-site$_B$ 103 are synchronized to one another by an external synchronization system, which in the preferred embodiment is the global positioning system (GPS). Also depicted in FIG. 1 is the communication link which is used as the coupling means embodiment, the communication link is a T1 link. In alternate embodiments, the communication link may be, inter alia, a JT1 link, a CEPT link, and a microwave link. Continuing, T1$_A$ link 105 couples central-site 100 to base-site$_A$ 102. Also, T1$_B$ link 106 is shown coupling central-site 100 to base-site$_B$ 103. In the preferred embodiment, T1 links are employed between the central-site 100 and base-site$_A$ 102 and base-site$_B$ 103 because these links already exist and are more the most common and inexpensive medium for such distribution.

Distributing synchronization information from central-site 100 through T1$_A$ link 105 and T1$_B$ link 106 in an ordinary updating fashion does not perform properly due to the characteristics of a generic T1 link. This is true since the T1 delay as a function of time, and the delay differences between the two directions on a T1 link, add an uncertainty of several hundred microseconds ($\mu$sec) to the synchronization update process.

A T1 link could be routed through several clock reconstruction elements such as a multiplexer, a microwave transmission, and 2-wire ping-pong devices. These possible clock reconstruction elements are shown in T1$_A$ link 105 as $N_{A1}-N_{A5}$ 111-115. Clock reconstruction elements are also depicted in T1$_B$ link 106 as elements $N_{B1}-N_{B3}$ 121-123. To determine the delay on a T1 link, the delay contribution of a typical T1 link as a function of time can be expressed as:

$$Delay(t) = (miles)(5.4 \; \mu sec) + (K+1)(wander(t)) + (K+1)(jitter(t)) + (K)(125 \; \mu sec \; slip) \qquad (1)$$

where K = the number of clock reconstruction elements and the 125 $\mu$sec slip is a random slip. From equation (1), the first term is a constant that is varied between central site 100 and base-sites 102, 103 and the two directions on the corresponding T1 link. The wander delay variation in time is caused by both a variation in elastic buffer size at a rate that is slower than 10 Hz, and by the T1 link wander contribution caused mainly by long term temperature effects. In some circumstances, the wander could possibly contribute up to 18 μsec (by each clock reconstruction element) in a cycle of up to days.

The jitter delay is a short term variation delay that is caused by both the size of the elastic buffer variation at a rate higher than 10 Hz, and by the variation in clock reconstruction thresholds in T1 termination and repeaters. For a more comprehensive explanation of jitter and wander, a jitter/wander model is described CCITT G823/G824. For more information, see CCITT Bluebook, published Nov. 25, 1988 in Geneva, Switzerland.

The occurrence of a 125 μsec slip is a slip of one frame which is necessary to maintain frame synchronization in a temporary network instability situation. The most difficult terms to overcome in order to maintain the CDMA synchronization accuracy are the wander contributions, the frame slips, and the difference in delay between receive and transmit directions on a T1 link.

Figure 2:
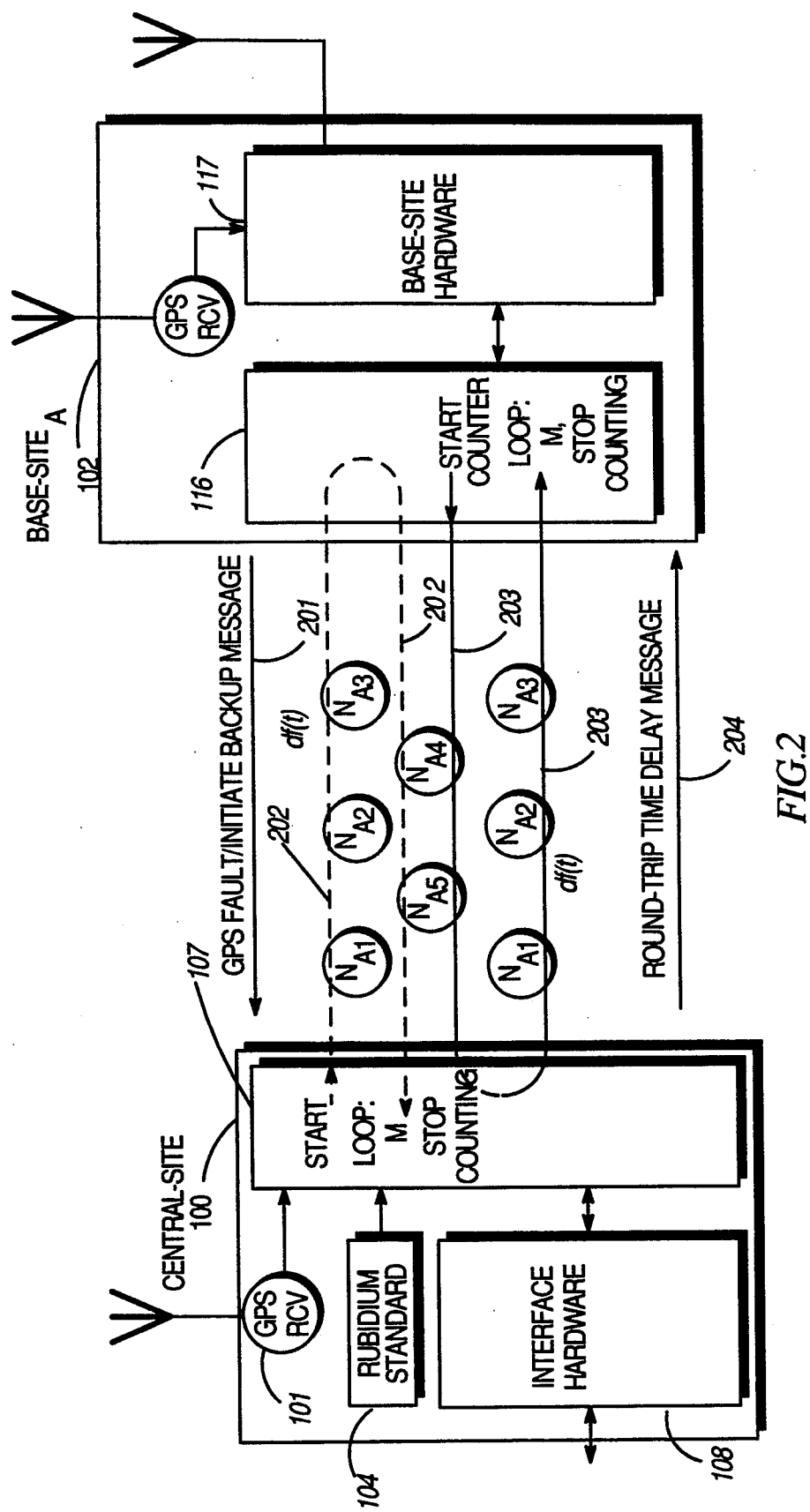
FIG. 2 generally illustrates the centralized standard for GPS backup technique based on a synchronized measurement of a round-trip time delay by both central-site 100 and base-site$_A$ 102.

FIG. 2 generally illustrates the centralized standard for GPS backup technique based on a synchronized measurement of a round-trip time delay by both central-site 100 and, for this example, base-site$_A$ 102. The same process occurs between central-site 100 and base-site$_B$ 103, but is not discussed here for the sake of convenience. The technique capitalizes on the fact that rubidium standard 104 used in central-site 100 will provide a more accurate clock than will the clock used in base-site$_A$ 102, and by having each site 100, 102 measure round-trip time delay, the better clock in central-site 100 can be used to compensate for the clock in base-site$_A$ 102. The measured round-trip time delay is given by $(M)(df(t)+dr(t))$, where M is the number of loops or round-trips, $df(t)$ is the forward delay (central-site 100 to base-site$_A$ 102), and $dr(t)$ is the reverse delay (base-site$_A$ 102 to central-site 100). When GPS is lost, base-site$_A$ 102 informs central-site 100 on the occurrence of a GPS fault and sends an initiate backup message 201. The synchronization of the distance measurement between base-site$_A$ 102 and central-site 100 is essential for long-term wander cancellation. Also, significant to note is that synchronization between base-site$_A$ 102 and central-site 100 can be done by starting the procedure at the same time, based on the neglected short-term drift of the chosen standard in central-site 100 and base-site$_A$ 102. In the preferred embodiment, the central standard for GPS backup located at central-site 100 is a rubidium standard. Continuing, in this case, the phase difference between the two measurements will be the delay for only one direction. Using an alternate synchronization technique, base-site$_A$ 102 can invoke a measurement by synchronizing to a master sequence sent by central-site 100. In this case, the phase difference between the measurements will be one round-trip.

Upon receipt of synchronization message 201, central-site 100 will start a measurement counter within measurement circuitry 107 and will send a master sequence 202 to base-site$_A$ 102 via T1$_A$ link 105. Upon receipt and correlation of master sequence 202, base-site$_A$ 102 starts its own counter within measurement circuitry 116 at a time specified by message 201, and also sends a sequence 203 to central-site 100. In the preferred embodiment, master sequence 202 and sequence 203 are the same sequence; in alternate embodiments, they need not be the same sequence. Base-site$_A$ 102 loops back master sequence 202 to central-site 100, while central-site 100 loops back sequence 203 to base-site$_A$ 102. After M loops, both central-site 100 and base-site$_A$ 102 stop counting, and central-site 100 sends its measured round-trip time delay to base-site$_A$ 102 in message 204. Base-site$_A$ 102 then performs a drift calculation between its own round-trip time delay and that measured by central-site 100. The number of loops M required is calculated based on the anticipated absolute drift in base-site$_A$ 102 necessary to maintain an adequate timing adjustment for resolution and jitter/wander averaging contribution of less than 1 μsecond. The determination of the number of loops is given by (clock drift)$(M)(df(t)+dr(t))>>$(local adjustment resolution). Base-site$_A$ 102 then compensates for the discrepancies between the round-trip time delay measurements by adjusting its local clock. By repeating this technique between central-site 100 and base-site$_B$ 103 via T1$_B$ link 106, and any other base-site connected to central-site 100, absolute synchronization of base-sites to one another is achieved without the use of GPS. In this manner, existing T1 links may be employed to maintain absolute synchronization between base-site$_A$ 102 and base-site$_B$ 103 upon removal of GPS from a single rubidium standard located at central-site 100.

Figure 3:
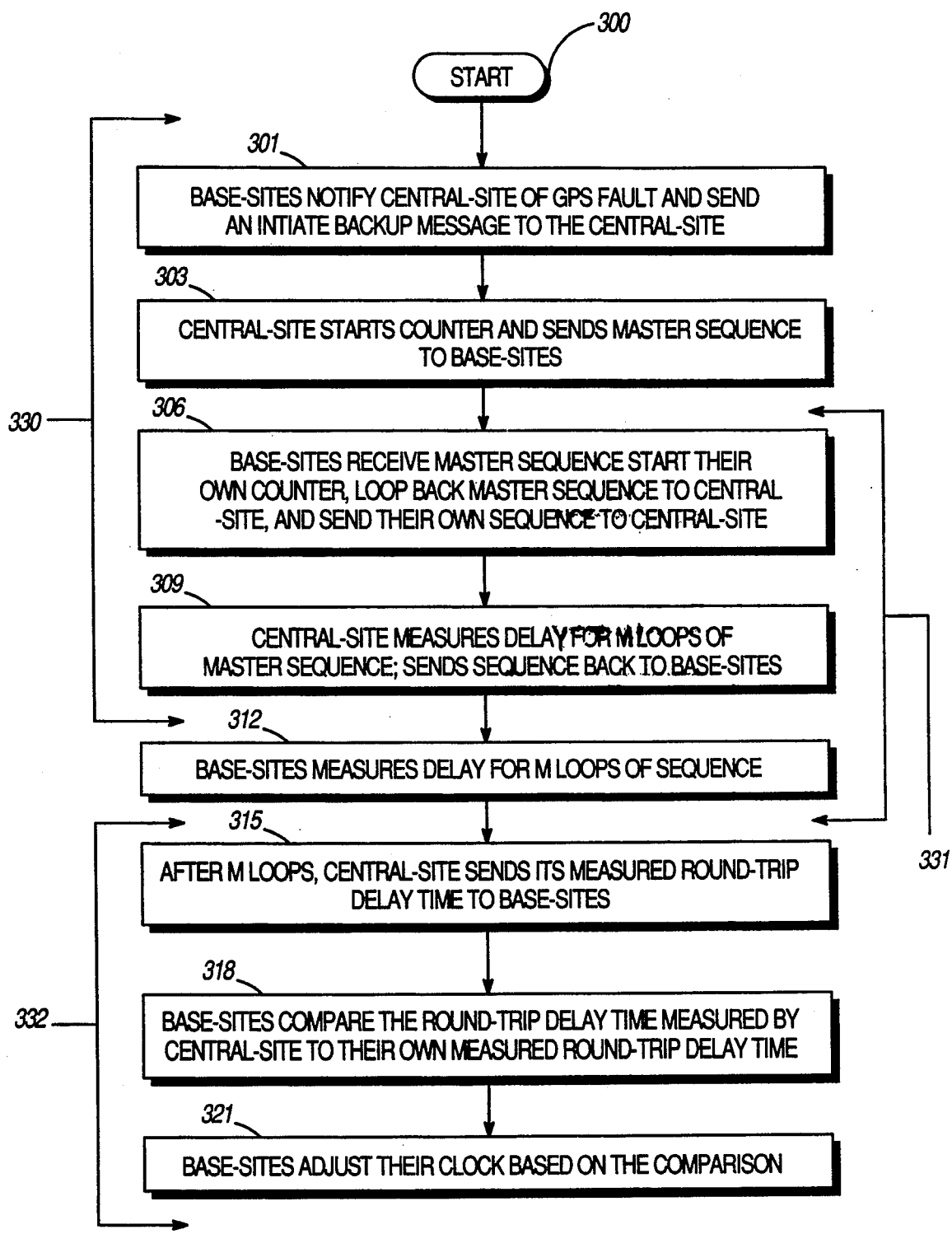
FIG. 3 generally depicts a flow diagram of the steps taken by a communication system to synchronize base-sites to one another using a centralized standard in accordance with the invention.

FIG. 3 generally depicts a flow diagram of the steps taken by a communication system to synchronize base-sites to one another using a centralized standard in accordance with the invention. In general, the communication system measures, at step 330, a first round-trip time delay at central-site 100, measures, at step 331, a second round-trip time delay at each of a plurality of base-sites, and compensates, at step 332, for discrepancies in the measured round-trip time delays between the central-site 100 and each of the plurality of base-sites. More specifically, the technique starts at step 300 when base-sites 102, 103 notifies, at step 301, central-site 100 of the elimination of GPS and sends an initiate backup message 201 to central-site 100. GPS may be eliminated by, inter alia, maintenance on the GPS satellite, non-coverage during a specific time of day, loss of a GPS receiver 101, 118, 125, etc. Central-site then starts a counter and sends master sequence 202 to base-sites 102, 103 at step 303. Base-site 102, 103 receive, at step 306, master sequence 202; start their own counter; loop back master sequence 202 to central-site 100; and send their own sequence 203 to central-site 100. Central-site 100 measures, at step 309, delay for M loops of master sequence 202 and also sends back sequence 203 to base-sites 102, 103. Base-sites 102, 103 measure, at step 312, delay for M loops of their sequence 203. After M loops, central-site 100 sends, at step 315, its measured round-trip time delay in message 204. Base-sites 102, 103 compare, at step 318, the round-trip time delay measured by central-site 100 to their own measure round-trip time delay and adjust, at step 321, their clock based on the comparison.

The technique employed in both FIG. 1 and FIG. 2 has several inherent advantages. First, a frame slip, where a frame in a CDMA radiotelephone system is 125 μsec, can be detected by comparing the last loop or round-trip time delay to the previous one for N×125 μsec delay differences. This value will then be subtracted from the last loop or round-trip time delay measurement. Also, the technique employs an adaptive correlation technique used by the looping sequence in order to eliminate the impact of transmission errors on the measurement process.

Thus, it will be apparent to one skilled in the art that there has been provided in accordance with the invention, a method and apparatus for synchronizing base-sites in a communication system utilizing a centralized standard that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What I claim is:

1. A communication system having a central-site coupled to a plurality of base-sites, the communication system comprising:
   means, at the central-site, for providing a synchronization signal;
   means, at the central-site and coupled to said means for providing, for measuring a round-trip time delay between the central-site and each of the plurality of base-sites;
   means, at each of the plurality of base-sites, for measuring a round-trip time delay; and
   means, at either the central-site or each of the plurality of base-sites, for compensating the discrepancies in said measured round-trip time delays between the central-site and each of the plurality of base-sites.

2. The communication system of claim 1 further comprising means for synchronizing the plurality of base-sites to one another utilizing an external synchronization system.

3. The communication system of claim 2 wherein said means for synchronizing the plurality of base-sites to one another utilizing an external synchronization system further comprises means for synchronizing to the global positioning system (GPS).

4. The communication system of claim 1 wherein said means for providing a synchronization signal further comprises either a rubidium standard, a cesium standard, or an oscillator.

5. The communication system of claim 1 wherein said communication system is a code-division multiple access (CDMA) radiotelephone system.

6. The communication system of claim 1 wherein said central-site is coupled to the plurality of base-sites via one of either a T1 link, a JT1 link or a CEPT link.

7. The communication system of claim 1 wherein said central-site is one of either an earth-based central-site or a space-based central-site.

8. A code-division multiple access (CDMA) radiotelephone system having a central-site coupled to a plurality of base-sites, the communication system comprising:
   means, at the central-site, for providing a synchronization signal;
   means, at the central-site and coupled to said means for providing, for measuring a round-trip time delay between the central-site and each of the plurality of base-sites;
   means, at each of the plurality of base-sites, for measuring a round-trip time delay; and
   means, at either the central-site or each of the plurality of base-sites, for compensating the discrepancies in said measured round-trip time delays between the central-site and each of the plurality of base-sites.

9. The CDMA radiotelephone system of claim 8 wherein said central-site is coupled to the plurality of base-sites via a T1 link.

10. A method of synchronization in a communication system, the communication system having a central-site coupled to a plurality of base-sites, the method comprising the steps of:
    providing, at the central-site, a synchronization signal;
    measuring, at the central-site, a round-trip time delay between the central-site and each of the plurality of base-sites;
    measuring at each of the plurality of base-sites, a round-trip time delay; and
    compensating, at either the central-site or each of the plurality of base-sites, the discrepancies in said measured round-trip time delays between the central-site and each of the plurality of base-sites.

11. A method of maintaining synchronization in a communication system, the communication system having a central-site coupled to a plurality of base-sites, the plurality of base-sites synchronized to one another by an external synchronization system, the method comprising the steps of:
    providing, at the central-site, a synchronization signal;
    measuring, at the central-site, a first round-trip time delay between the central-site and each of the plurality of base-sites;
    measuring, at each of the plurality of base-sites, a second round-trip time delay;
    comparing said first round-trip time delay and said second round-trip time delay;
    compensating, at either the central-site or each of the plurality of base-sites, the discrepancies in said measured round-trip time delays between the central-site and each of the plurality of base-sites; and
    repeating said steps of measuring a first round-trip time delay and measuring a second round-trip time delay.

12. A method of maintaining synchronization in a communication system, the communication system having a central-site coupled to a plurality of base-sites, the plurality of base-sites having been previously synchronized to one another by an external synchronization system, the external synchronization system having been subsequently removed, the method of maintaining synchronization comprising the steps of:
    sending, from each of the plurality of base-sites, an initiate backup message to the central-site upon loss of the external synchronization system;
    measuring, at the central-site, a round-trip time delay between the central-site and the plurality of base-sites;
    measuring, at each of the plurality of base-sites, a round-trip time delay between each of the plurality of base-sites and the central-site;
    comparing, at each of the plurality of base-sites, said round-trip time delays measured by each of the plurality of base-sites and the central-site; and
    maintaining synchronization among the plurality of base-sites based on said step of comparing.

13. The method of claim 12 wherein said step of measuring, at each of the plurality of base-sites, begins at a predetermined time after said initiate backup message is sent.

* * * * *